(12) United States Patent
Osborne et al.

(10) Patent No.: US 11,714,104 B2
(45) Date of Patent: Aug. 1, 2023

(54) AFM IMAGING WITH CREEP CORRECTION

(71) Applicant: Bruker Nano, Inc., Santa Barbara, CA (US)

(72) Inventors: Jason Osborne, Lompoc, CA (US); Sean Hand, Santa Barbara, CA (US); Vladimir Fonoberov, Santa Barbara, CA (US); James Young, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 17/329,620

(22) Filed: May 25, 2021

(65) Prior Publication Data

US 2022/0381803 A1 Dec. 1, 2022

(51) Int. Cl.
| | |
|---|---|
| *G01Q 30/06* | (2010.01) |
| *G01Q 60/38* | (2010.01) |
| *G01Q 10/04* | (2010.01) |
| *B82Y 35/00* | (2011.01) |
| *G01Q 20/04* | (2010.01) |
| *G01Q 60/34* | (2010.01) |

(52) U.S. Cl.
CPC .............. *G01Q 30/06* (2013.01); *B82Y 35/00* (2013.01); *G01Q 10/045* (2013.01); *G01Q 20/04* (2013.01); *G01Q 60/34* (2013.01); *G01Q 60/38* (2013.01)

(58) Field of Classification Search
CPC ......... G01Q 30/04; G01Q 30/06; G01Q 60/34
See application file for complete search history.

(56) References Cited

U.S. PATENT DOCUMENTS

| | | | |
|---|---|---|---|
| 5,898,106 A | 4/1999 | Babcock et al. | |
| 7,249,002 B1* | 7/2007 | Ben-Dov | B82Y 35/00 |
| | | | 702/195 |
| 8,296,860 B2 | 10/2012 | Liu et al. | |
| 2007/0251306 A1 | 11/2007 | Zhou et al. | |
| 2009/0260113 A1 | 10/2009 | Rice et al. | |
| 2010/0122385 A1* | 5/2010 | Hu | G01Q 20/00 |
| | | | 850/5 |
| 2013/0081159 A1 | 3/2013 | Liu et al. | |
| 2013/0276174 A1 | 10/2013 | Li et al. | |
| 2014/0226003 A1 | 8/2014 | Phaneuf et al. | |
| 2017/0299628 A1 | 10/2017 | Proksch et al. | |
| 2018/0095107 A1 | 4/2018 | Dunn | |
| 2020/0041541 A1* | 2/2020 | Osechinskiy | G01Q 60/366 |

* cited by examiner

*Primary Examiner* — Eliza W Osenbaugh-Stewart
(74) *Attorney, Agent, or Firm* — Boyle Fredrickson S.C.

(57) ABSTRACT

An atomic force microscope (AFM) and method of operating the same includes a separate Z height sensor to measure, simultaneously with AFM system control, probe sample distance, pixel-by-pixel during AFM data acquisition. By mapping the AFM data to low resolution data of the Z height data, a high resolution final data image corrected for creep is generated in real time.

16 Claims, 6 Drawing Sheets

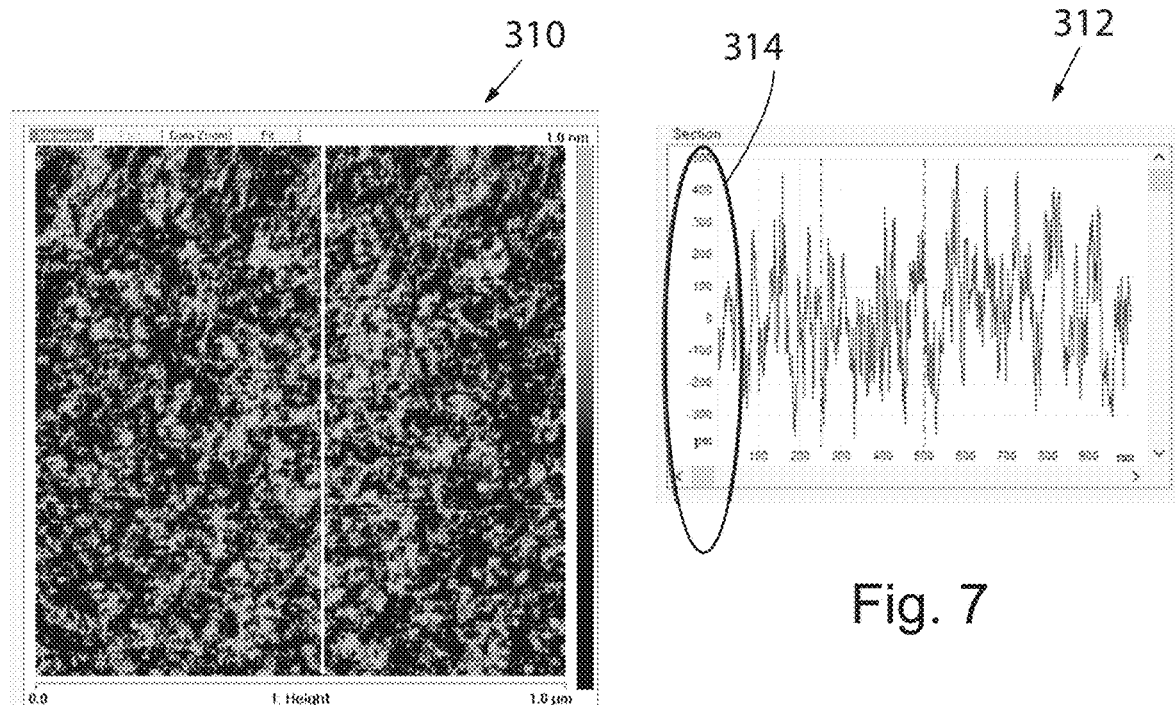
Fig. 6
Fig. 7
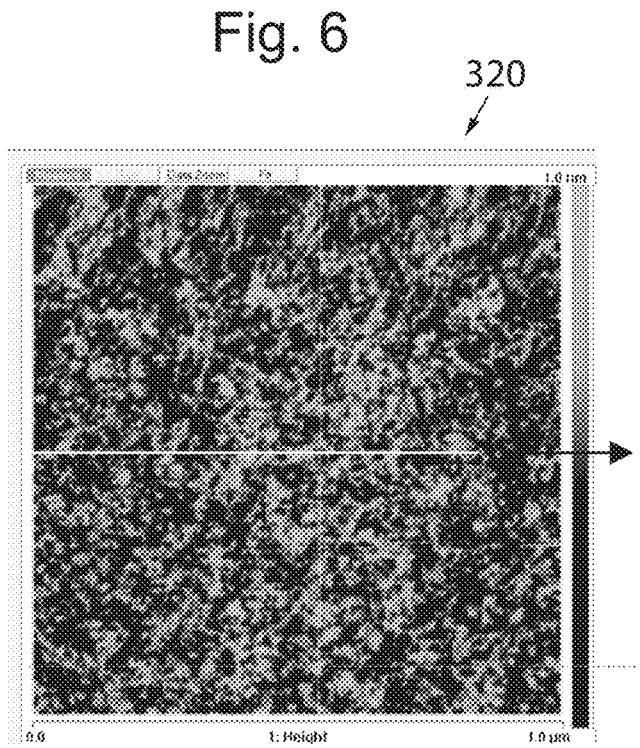
Fig. 8
Fig. 9

AFM IMAGING WITH CREEP CORRECTION

BACKGROUND OF THE INVENTION

Field of the Invention

The preferred embodiments are directed to Atomic Force Microscopy (AFM), and in particular, a method to correct for creep in the system, in real time during AFM data collection.

Description of Related Art

Scanning probe microscopes such as atomic force microscopes (AFMs) are devices which employ a probe having a tip, and causing the tip to interact with the surface of a sample with appropriate forces to characterize the surface down to atomic dimensions. Generally, the probe is introduced to a surface of a sample and by providing relative scanning movement between the tip and the sample, surface characteristic data can be acquired over a particular region of the sample, and a corresponding map of the sample can be generated.

A typical AFM system is shown schematically in FIG. 1. An AFM 10 employing a probe device 12 including a probe 14 having a cantilever 15. Scanner 24 generates relative motion between the probe 14 and sample 22 while the probe-sample interaction is measured. In this way, images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes, for example, a piezoelectric tube actuator. Alternatively, the scanner may be an assembly of multiple separate actuators. Some AFMs separate the scanner into multiple components, for example an XY scanner that moves the sample and a separate Z-actuator that moves the probe. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

In a common configuration, probe 14 is often coupled to an oscillating actuator or drive 16 that is used to drive probe 14 at or near a resonant frequency of cantilever 15. Alternative arrangements measure the deflection, torsion, or other motion of cantilever 15. Probe 14 is often a microfabricated cantilever with an integrated tip 17.

Commonly, an electronic signal is applied from an AC signal source 18 under control of an SPM controller 20 to cause actuator 16 (or alternatively scanner 24) to drive the probe 14 to oscillate. The probe-sample interaction is typically controlled via feedback by controller 20. Notably, the actuator 16 may be coupled to the scanner 24 and probe 14 but may be formed integrally with the cantilever 15 of probe 14 as part of a self-actuated cantilever/probe.

Often, a selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26. As the beam translates across detector 26, appropriate signals are processed at block 28 to, for example, determine RMS deflection and transmit the same to controller 20, which processes the signals to determine changes in the oscillation of probe 14. In general, controller 20 generates control signals to maintain a relative constant interaction between the tip and sample (or deflection of the lever 15), typically to maintain a setpoint characteristic of the oscillation of probe 14. More particularly, controller 20 may include a PI Gain Control block 32 and a High Voltage Amplifier 34 that condition an error signal obtained by comparing, with circuit 30, a signal corresponding to probe deflection caused by tip-sample interaction with a setpoint. For example, controller 20 is often used to maintain the oscillation amplitude at a setpoint value, $A_s$, to ensure a generally constant force between the tip and sample. Alternatively, a setpoint phase or frequency may be used.

A workstation 40 is also provided, in the controller 20 and/or in a separate controller or system of connected or stand-alone controllers, that receives the collected data from the controller and manipulates the data obtained during scanning to perform point selection, curve fitting, and distance determining operations.

AFMs may be designed to operate in a variety of modes, including contact mode and oscillating mode. Operation is accomplished by moving either the sample or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature and tilt that deviate from a flat plane, hence the use of the term "generally parallel." In this way, the data associated with this vertical motion can be stored and then used to construct an image of the sample surface corresponding to the sample characteristic being measured, e.g., surface topography. In one mode of AFM operation, known as TappingMode™ AFM (TappingMode™ is a trademark of the present assignee), the tip is oscillated at or near a resonant frequency of the associated cantilever of the probe. A feedback loop attempts to keep the amplitude of this oscillation constant to minimize the "tracking force," i.e., the force resulting from tip/sample interaction.

Alternative feedback arrangements keep the phase or oscillation frequency constant. As in contact mode, these feedback signals are then collected, stored, and used as data to characterize the sample. Note that "SPM" and the acronyms for the specific types of SPMs, may be used herein to refer to either the microscope apparatus or the associated technique, e.g., "atomic force microscopy." In an improvement on the ubiquitous TappingMode™, called Peak Force Tapping® (PFT) Mode, discussed in U.S. Pat. Nos. 8,739,309, 9,322,842 and 9,588,136, which are expressly incorporated by reference herein, feedback is based on force (also known as a transient probe-sample interaction force) as measured in each oscillation cycle.

Regardless of their mode of operation, AFMs can obtain resolution down to the atomic level on a wide variety of insulating and conductive surfaces in air, liquid, or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

In this regard, AFMs may be employed in automated applications, including in high-precision manufacturing processes such as in semiconductor fabrication. Because AFMs can provide high resolution measurement of nanoscale surface features (e.g., topography), AFM has proven to be useful in the semiconductor space. However, classically, AFM data has been hindered by mechanical perturbations in the system, including drift and creep, both of which are intrinsic problems to most AFMs. Drift is an artifact that occurs in any type of SPM, or indeed any microscopy, but is much more serious in high resolution techniques like AFM. It is known as "drift" because, in general, the sample (or probe) moves slowly in a certain direction. This can typically be recognized as a "distortion" of the image, which changes when you change the slow scan direction. The effect may be particularly pronounced if the user moves to a new region of interest within the scan range. Piezo creep occurs because when you apply a set voltage to the piezo scanner, and then try to maintain it in order to move to a particular location, the piezo tends to continue to move in the same direction for a certain period of time. Essentially this means, especially when a new image scan is started, there will be some stretching or compression of features. Piezo creep will often settle down over time during the AFM image scan, but remains a problem.

Imprecision in the detection of the cantilever motion may also lead to errors in scanning. Scanners can also "age", i.e., their characteristics, including bow and hysteretic effects, can change significantly with time. These factors can also preclude accurate vertical metrology measurements. Furthermore, the repeatability of the measurements may be compromised because hysteresis and aging cause them to change with time, sample tilt, and other factors, making pre-calibration difficult at the level of accuracy needed.

Conventional techniques used to remove instrument error typically are not successful in removing the AFM scanner errors and detection idiosyncrasies like those described above. One such conventional technique involves modeling the instrument error as a simple mathematical function. For example, one can compute the best fit of the scan data to a theoretical surface defined by a polynomial or other simple function. Subtracting this theoretical surface from the scanning data then removes part of the scanning error. In the case of an AFM, however, the bow, hysteresis, and detection errors often are not accurately described by simple mathematical functions. Furthermore, the fitting step can be compromised by features that deviate from a smooth surface, perhaps the very features requiring measurement. Fitting and subtraction therefore do not lead to improvements in accuracy sufficient for many applications (such as measuring pole tip recession) which require an accuracy on the order of 1 nm.

Another type of attempt to correct for instrument error uses reference subtraction. In this technique, a reference scan is made of a standard sample. A likely reference sample candidate would be one having a flat surface such as that of a cleaved or polished silicon wafer. This scan then is subtracted from all data scans of subsequent samples. See U.S. Pat. No. 5,283,630 by Yoshizumi. This technique is commonly also used with interferometers to correct for optical imperfections. In the case of the AFM, however, hysteresis leads to scanner idiosyncrasies that depend on overall sample tilt which may vary significantly from sample to sample. These errors therefore will vary from a reference sample to a new sample and from scan-to-scan. Hence, a "standard sample" does not exist, and it is not possible to remove scanning errors using standard reference subtraction.

Returning to creep, high resolution AFM data is taken with a control signal, the output, that is a scalable command signal sent to the piezo to achieve picometer resolution. But the signal is sensitive to the construction of the piezo, including the physics of the material. The piezo crystal itself behaves differently depending on how long it is in a certain physical position (extension/retraction), as well as the change in command voltage. This creates artifacts in the final data image that are challenging to remove given their complex nature ($2^{nd}$ order errors, etc.); in other words, it is difficult for post-processing algorithms to correct for these $2^{nd}$ order errors without creating more artifacts.

As a result, the AFM field, including automated AFM, was in need of a solution to identify and correct for mechanical perturbations in the AFM system, in particular, perturbations related to the scanner relative to the sample as Z height changes in the system, including effects due to system "creep." Improved data acquisition and display times were desired, while preserving resolution of AFM data, preferably with minimal post-image acquisition processing.

SUMMARY OF THE INVENTION

The preferred embodiments overcome the drawbacks of current AFM systems that attempt to address creep effects in AFM imaging by providing a system and method of separately measuring Z height with an independent sensor immune to creep effects and generating a reference image (i.e., plane). As the data scan is performed and AFM data is acquired, the system superimposes or maps that AFM data on the reference data in a way that corrects for creep. The method does not require post-imaging processing and improves image resolution, allowing real time delivery of creep corrected data to the user. Real time processing is the execution of data processing in a short time period during AFM image acquisition, providing near-instantaneous output. This permits system flexibility as expert users can adjust system parameters in real time to acquire improved AFM data.

According to one preferred embodiment, a method of atomic force microscopy (AFM) includes providing relative scanning motion between the probe and the sample in a region of interest of the sample. The providing step is a data scan having a fast scan axis and a slow scan axis. Next, the method includes detecting probe deflection during the providing step, probe deflection being indicative of a property of a surface of the sample. Then surface data is generated based on the detecting step, and simultaneously with the detecting step, Z height between a probe of the AFM and a sample is measured. The method generates Z height data based on the measuring step and then extracts a low resolution reference image from the Z height data. The surface data is then superimposed or mapped to the low resolution topography reference data to generate a final data image.

In another aspect of this preferred embodiment, the generating a final data image step is performed in real time during the providing and detecting steps.

According to another aspect of this preferred embodiment, the extracting step is performed in the slow scan axis of the data scan.

In a further aspect of this preferred embodiment, the measuring step is performed with a sensor coupled to a head of the AFM.

According to a still further aspect of this preferred embodiment, the sensor is supported by a scanner mounted as part of the AFM head. The scanner is preferably a piezoelectric tube scanner.

In yet another aspect of this preferred embodiment, the tube scanner is an XYZ tube scanner and the sensor is a capacitance sensor.

In a still further aspect of this preferred embodiment, the low resolution reference image defines a reference plane and the detecting step is performed in one of tapping mode, peak force tapping (PFT) mode and contact mode.

In another preferred embodiment, an atomic force microscope (AFM) includes a scanner that provides relative scanning motion between a probe of the AFM and a sample. To perform a data scan, a detector measures the deflection of the probe in response to probe-sample interaction, with the deflection being indicative of sample topography and stored as surface data. This deflection data is often corrupted by creep effects. Therefore, the AFM of the preferred embodiments also includes a sensor to measure Z height between the probe and the sample simultaneously with measuring probe deflection. Z height is stored as Z height data. A processor extracts reference data from the Z height data and maps the surface data to the reference data to generate a final data image of the sample.

According another aspect of this preferred embodiment, the reference data is along the slow scan axis of the data scan and is low resolution topography data.

In a further aspect of this preferred embodiment, the processor extracts the reference data and maps the surface data to the reference data in real time during AFM operation. Notably, the reference data is preferably a reference plane.

According to a still further aspect of this preferred embodiment, the sensor is a capacitance sensor coupled to a piezoelectric tube scanner.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 6 is a height image acquired with a separate Z height sensor to measure probe sample separation independent of AFM control;

FIG. 7 is a plot corresponding to the height image of FIG. 6, similar to that in FIG. 5, illustrating height data immune to creep;

FIG. 8 is a low resolution height image extracted from the Z sensor height image of FIG. 6;

FIG. 9 is a plot corresponding to FIG. 8, illustrating the low resolution height data;

DETAILED DESCRIPTION OF THE PREFERRED EMBODIMENTS

The preferred embodiments are directed to a creep correction method and system for Atomic Force Microscopy (AFM) which allows for minimizing the adverse effects of system creep in "Z" on AFM data, without post-image processing. The methods described herein include generating two sets of height data, one from the AFM control signal (standard AFM image) and one from a separate Z sensor coupled to the Z piezo actuator and measuring the distance from the piezo to the sample. While the Z command signal "creep" is primarily affected by the piezo response, which has both a command duration and temperature dependent sensitivity, to an input control voltage. The height measurement provided by the Z sensor is immune to system creep because the z sensor measures the physical displacement of the scanner to the sample surface which is primarily affected by a mechanical distance change of the scanner to the sample and to only a negligible amount by either command duration or temperature.

Figure 1:
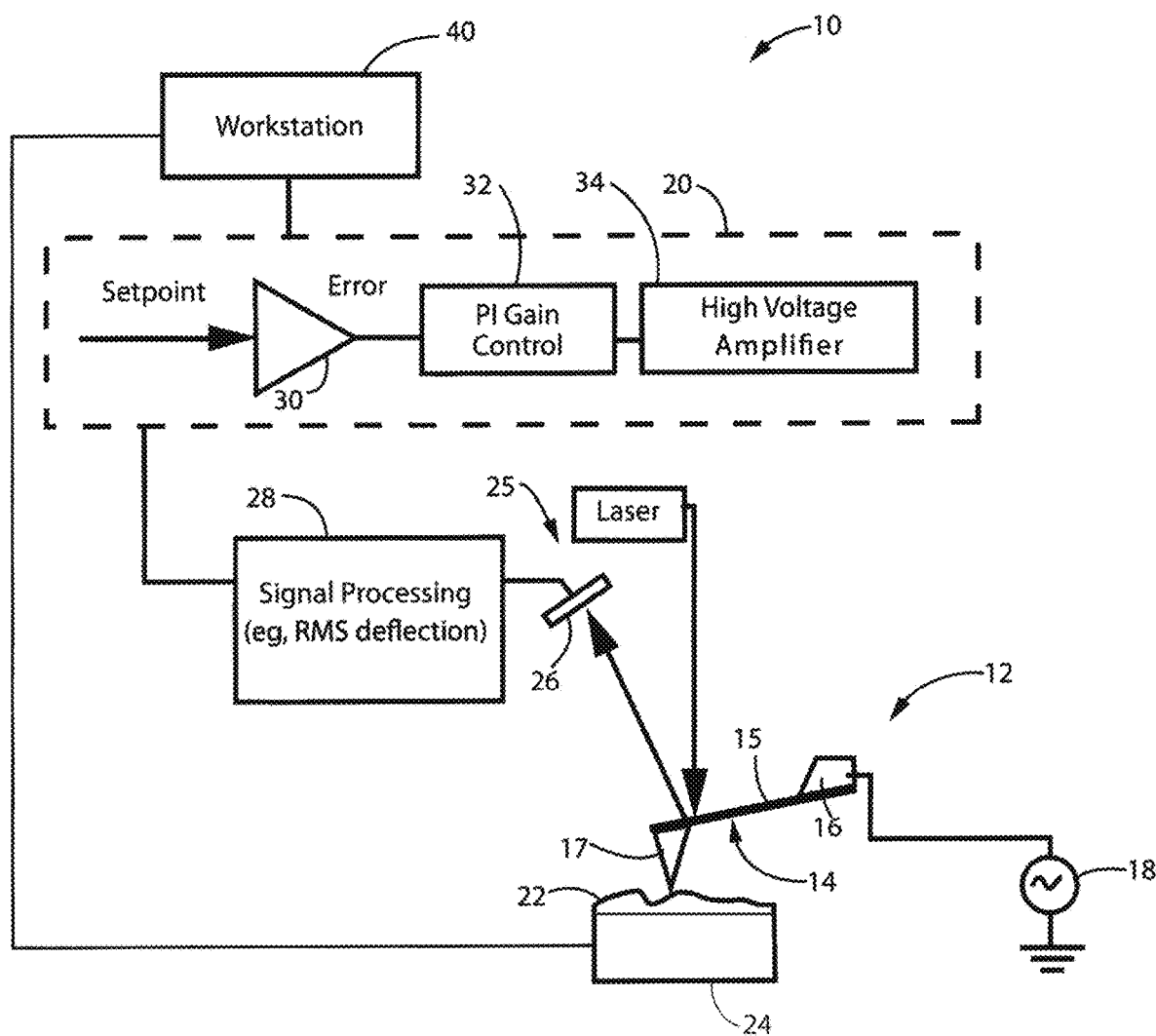
FIG. 1 is a schematic illustration of a Prior Art atomic force microscope (AFM)
Figure 2:
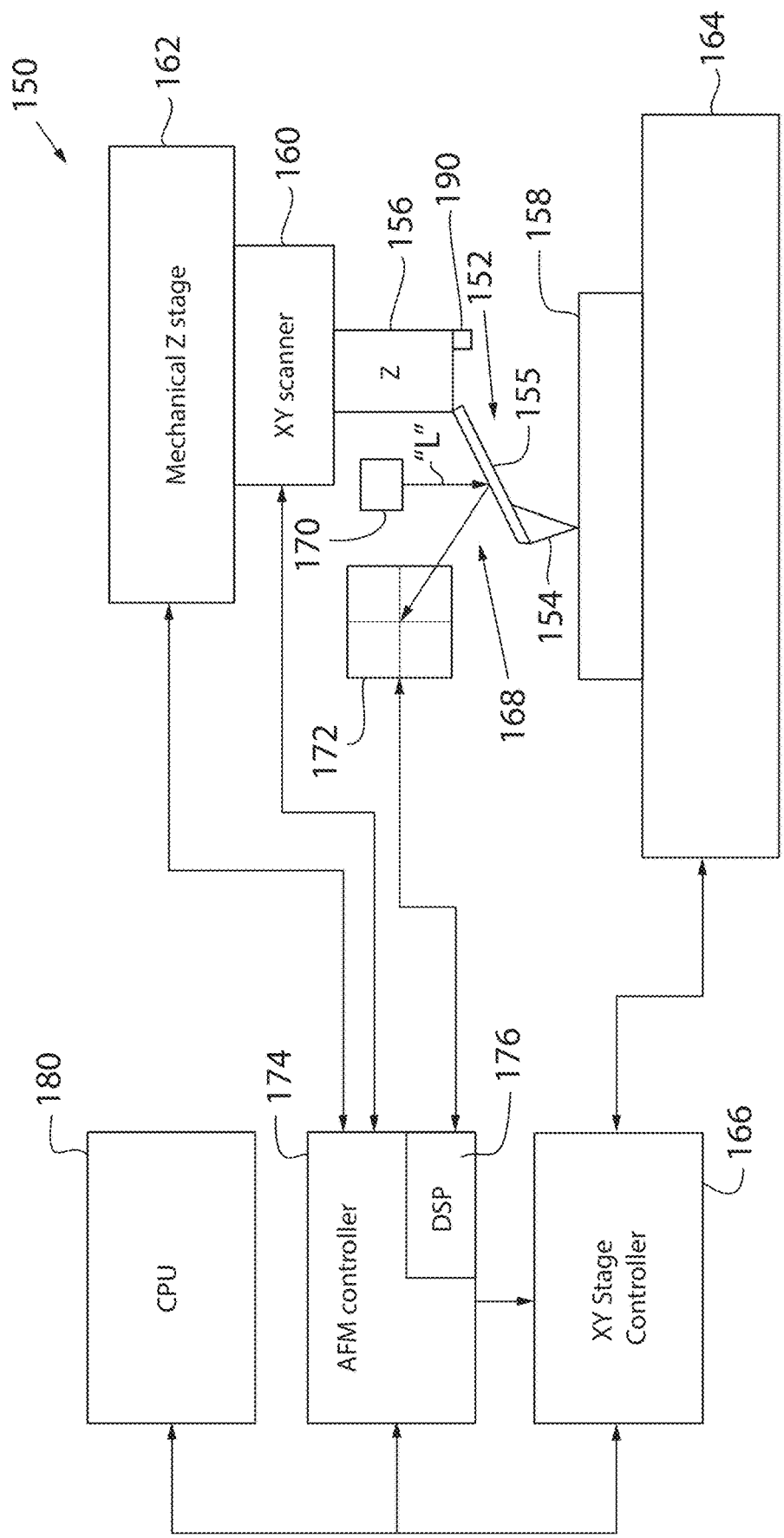
FIG. 2 is a block diagram of an AFM system for acquiring AFM data and correcting for creep without post-data acquisition processing.

A scanning probe microscope instrument 150 (e.g., AFM) according to a preferred embodiment is shown in FIG. 2. In this embodiment, a probe 152, having a tip 154 extending from a distal end of a cantilever 155 is held by a probe holder (not shown) that supported by an actuator, such as a piezoelectric tube scanner 156. Scanner 156 is a "Z" or vertical scanner responsive to sample properties in the closed loop control system to position the tip 154 relative to a sample 158 during AFM imaging (alternative Z actuators may be provided, including self-actuated probes). In this embodiment, tube scanner 156 is coupled to an XY scanner 160, preferably also a piezoelectric tube, that is used to raster the probe tip 154 relative to the sample surface during AFM operation. A mechanical Z-stage 162 is employed for providing large movement in Z between tip 154 and sample 158, for example, during AFM start-up to engage tip 154 and sample 158 prior to operation and image acquisition. Tube scanners 156, 160 and mechanical Z stage 162 are mounted as part of the AFM head (not separately shown). Sample 158 is mounted on an XY stage 164 that primarily provides coarse XY motion to position probe 152 at a region of interest of sample 158. An XY stage controller 166 controls stage 164 to locate the probe/sample at that region of interest. However, stage 164 may be configured to provide relative scanning motion between tip 154 and sample 158 at a selected scan speed, depending on the application. Controller 174 provides the instructions to position the image scan at a region of interest. Controllers 166, 174 are implemented by a computer 180.

AFM 150 also includes a Z metrology or position sensor 190 for sensing the distance between scanner 156 (probe coupled thereto) and sample 158, i.e., Z height. Sensor 190 is preferably a capacitive sensor, but other suitable options may be used. Because the height sensor is primarily sensitive to the physical distance change of the scanner to the sample, and not the varying response of the piezo to the incoming control signal, which is responsible for creep, the height measurement is immune to the creep artifact.

In operation, after tip 154 is engaged with sample 158, a high speed scan of the sample is initiated with XY scanner 160 in an AFM mode of operation (e.g., PFT mode), as discussed previously. As tip 154 interacts with the surface of sample 158, the probe 152 deflects and this deflection is measured by an optical beam-bounce deflection detection apparatus 168. Apparatus 168 includes a laser 170 that directs a beam "L" off the backside of cantilever 155 and toward a photodetector 172 which transmits the deflection signal to, for example, a DSP 176 of AFM controller 174 for high speed processing of the deflection signal.

AFM controller 174, via DSP 176, continuously determines a control signal according to the AFM operating mode, and transmits that signal to the piezo tube 156 to maintain the Z position of probe 152 relative to sample 158, and more specifically, to maintain deflection of the probe at the feedback setpoint. Controller 174 also implements the real-time processing of the data acquired from both the AFM control and the Z height sensor. This real time processing is further illustrated in the method shown in FIG. 3.

Figure 3:
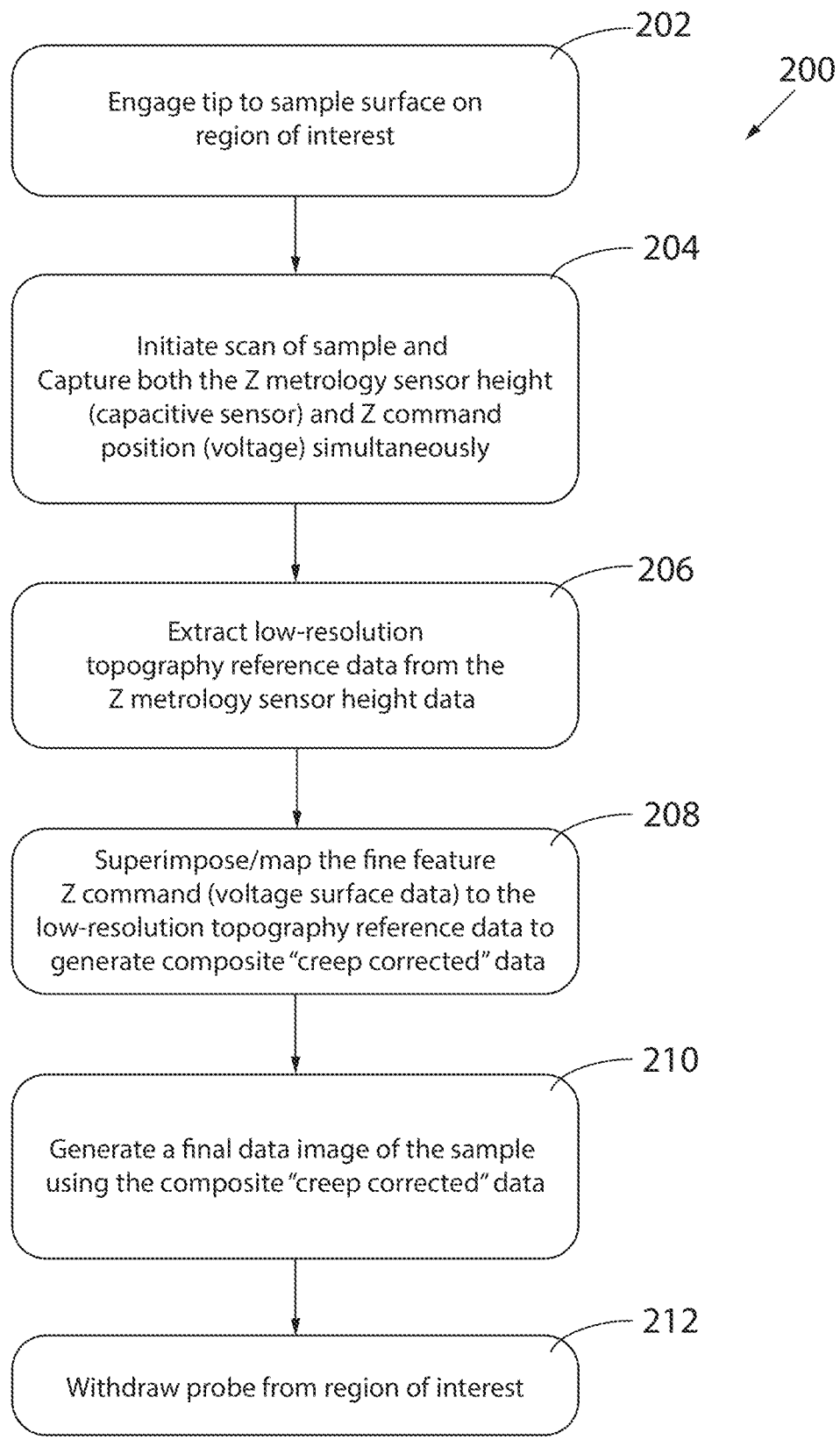
FIG. 3 is a flow chart illustrating a creep correction method of the preferred embodiments.

Turning to FIG. 3, a method 200 of real-time correction of the creep effect in AFM image data is shown. In Block 202, the AFM tip is engaged with the sample surface at a region of interest. Then a scan of the sample is initiated in Block 204 in a selected mode of AFM operation. In addition to the Z command position signal (a voltage, indicative of topography), the sensed height by the Z metrology sensor (190 in FIG. 2, e.g., capacitive sensor) is captured and recorded. This data is acquired simultaneously at each scan location. In Block 206, method 200 extracts low-resolution topography reference data from the Z metrology sensor. This is the low resolution portion of the height data acquired by sensor 190 (i.e., the sensor height data extracted in the slow scan axis of the data scan). This data provides a reference plane of the region of interest for subsequent removal/minimization of time/voltage dependent errors in position that do not relate to the physical sample surface.

Figure 10:
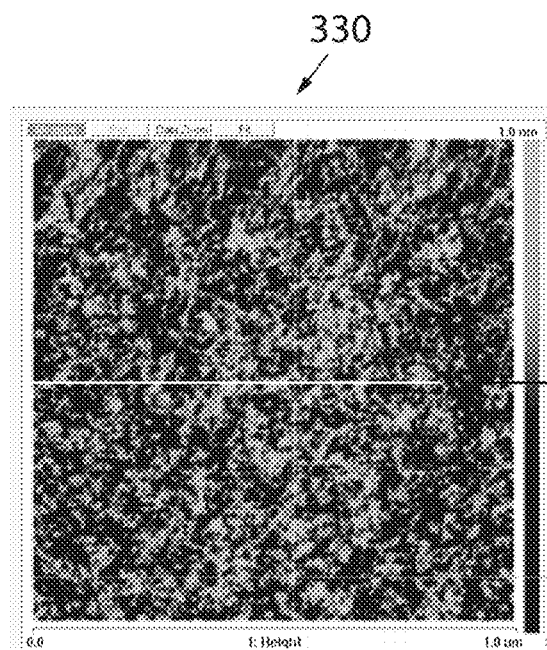
FIG. 10 is a composite high resolution topography image resulting from employing the real time creep correction method of the preferred embodiments.
Figure 11:
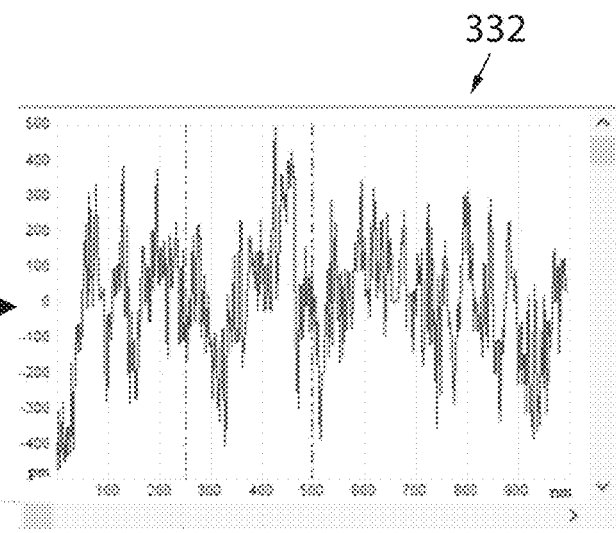
FIG. 11 is a plot corresponding to FIG. 10 illustrating creep correction of the AFM data.

The creep correction method 200 then includes, in Block 208, using the low-resolution topography reference data to achieve creep correction. More particularly, the surface data of corresponding to the AFM control signal, i.e., the fine feature Z command voltage, is superimposed/mapped on the low-resolution topography reference image data, line by line, in real time. By superimposing or mapping (e.g., subtracting) the surface data of the data scan to the low-resolution topography reference data (defining a reference plane), method 200 corrects for creep in the acquired AFM data. In Block 210, the method generates an image of the sample surface using the "creep corrected" data. As a result, AFM resolution is improved in real time. This also allows for real time adjustment of scan parameters to achieve improved AFM data quality. Method 200 and exemplary data are shown and described below in connection with FIGS. 4 and 5, FIGS. 6 and 7 along with a low resolution Z height image in FIG. 8 (showing transitions in FIG. 9). FIGS. 10 and 11 illustrate the creep corrected AFM image.

Figures 4, 5:
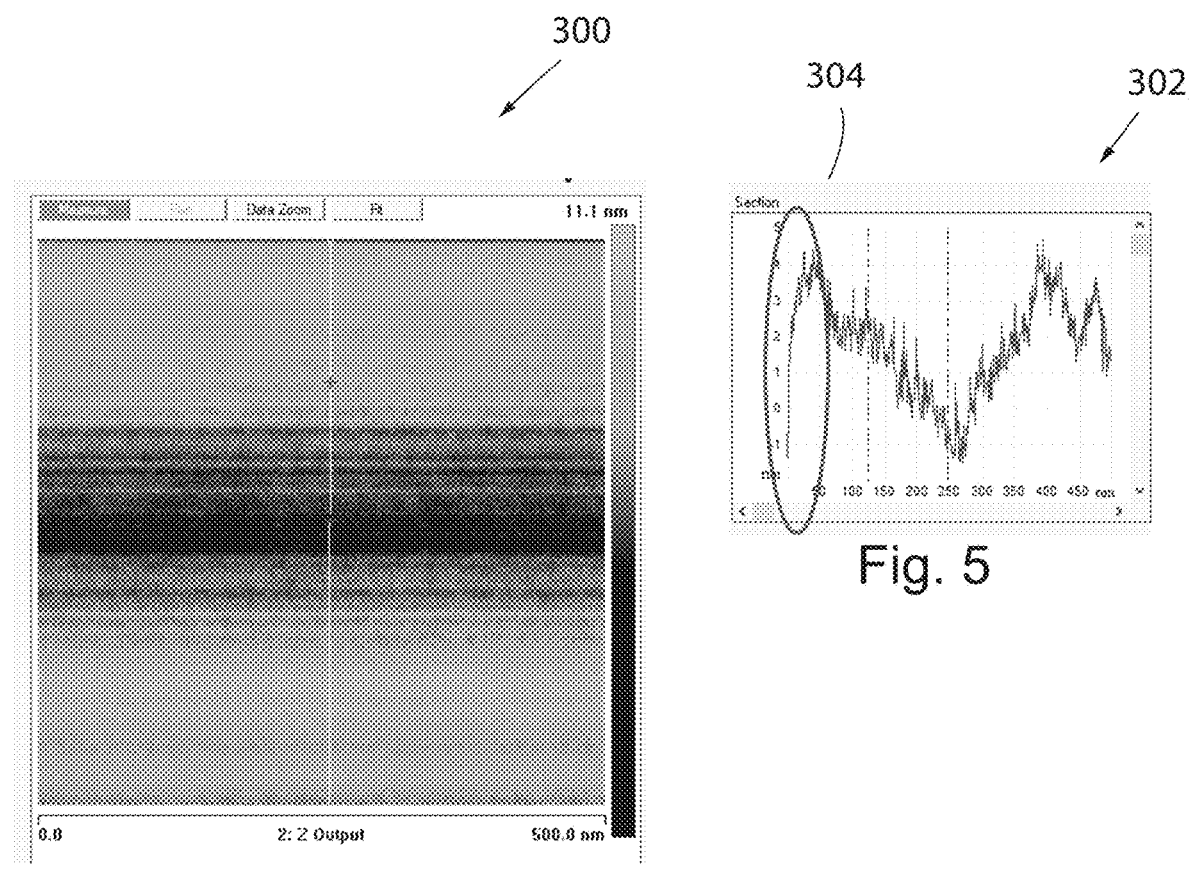
FIG. 4 is a raw AFM topography image, without creep correction.
FIG. 5 is a plot illustrating the effects of creep on AFM data shown in FIG. 4.

More particularly, turning initially to FIG. 4, a conventional AFM image of Z control signal 300 is shown in which a sample is imaged in a selected mode of AFM operation. This image includes the creep artifact in the data, illustrated in the graphs of the data in FIG. 5. As expected, the creep artifact compromises image detail/resolution. FIG. 5 is a graph 302 of a bare silicon wafer, where the plotted data shows the line to line z height variation on the Y axis, and the slow scan axis line position in the image on the X axis. The creep artifact associated non-linear change in Z position is highlighted in a region 304. Turning to FIG. 6, a height image generated from the output of Z sensor 190 (FIG. 2) is shown. In this case, details of the sample surface are not compromised by creep for the reasons noted previously. This is illustrated in FIG. 7. In FIG. 7, a graph of the line-to-line z height variation on the Y axis, and the slow scan axis line position in the image on the X axis does not show the abrupt non-linear change in position as highlighted by region 314. Sensor 190 data is time and voltage independent and therefore does not exhibit the $2^{nd}$ order "creep" error.

Next, as part of method 200 of the preferred embodiments, data corresponding to the low resolution portion of the height data acquired by sensor 190 is extracted. This image 320 shown in FIG. 8, and its data plotted in graph 322, shown in FIG. 9, is used as a topography reference (Block 206 in FIG. 3). As described previously, this topography reference 320 is free of creep effects. The fine feature Z command voltage AFM data (FIG. 4) is then mapped to the topography reference 320 to correct for creep in the AFM image 300. The result is shown as high resolution AFM image 330 in FIG. 10. Similar to the data 312 plotted in FIG. 7 for the height measurement of the sample surface using sensor 190 of system 100 (FIG. 2), creep corrected data 332 similarly no longer includes the $2^{nd}$ order creep error. Resolution of surface features is significantly improved, as shown in the referenced figures by removal of approximately 5 nm of creep artifact induced false sample topography. In a typical case, 1-10 nm of creep artifact may be successfully removed using the techniques described herein, significantly enhancing the resolution of surface features over a range of samples.

In sum, the preferred embodiments are directed to a method and apparatus that provide high resolution AFM images substantially free of $2^{nd}$ order creep error without the need for post-processing of the image. The creep correction technique is fully automated, being performed in real time while the image is being acquired—no creep is visible as the image is being acquired. AFM system creep is suppressed and no additional image distortion is introduced.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

We claim:

1. A method of atomic force microscopy (AFM), the method comprising:
   providing relative scanning motion between a probe and a sample in a region of interest of the sample to perform a data scan having a fast scan axis and a slow scan axis;
   detecting probe deflection during the providing step, probe deflection being indicative of topography of a surface of the sample;
   generating surface data based on the detecting step;
   measuring, simultaneously with the detecting step, Z height between the probe of the AFM and the sample with a sensor;
   generating Z height data based on the measuring step;

extracting low resolution topography reference data from the Z height data to obtain Z height data in the slow scan axis of the data scan;

mapping the surface data to the low resolution topography reference data to correct for AFM creep; and generating a final data image based on the mapping step.

2. The method of claim 1, wherein the generating a final data image step is performed in real time during the providing and detecting steps.

3. The method of claim 1, wherein the measuring step is performed with a sensor coupled to a head of the AFM.

4. The method of claim 3, wherein the sensor is supported by a actuator mounted in the AFM head.

5. The method of claim 3, wherein the sensor is a capacitance sensor.

6. The method of claim 3, wherein the actuator is a piezoelectric tube scanner.

7. The method of claim 1, wherein the low resolution topography reference data defines a reference plane.

8. The method of claim 1, wherein the detecting step is performed in one of tapping mode, peak force tapping (PFT) mode and contact mode.

9. The method of claim 1, wherein the mapping step maps the surface data to the reference data to compensate for the effects of AFM creep in the surface data.

10. An atomic force microscope (AFM) comprising:

a scanner that provides relative scanning motion between a probe of the AFM and a sample in a data scan having a fast scan axis and a slow scan axis;

a detector that measures a deflection of the probe in response to probe-sample interaction during AFM operation, the deflection being indicative of sample topography and stored as surface data;

a sensor to measure Z height between the probe and the sample simultaneously with measuring probe deflection, Z height being stored as Z height data; and a processor that extracts reference data from the Z height data, the reference data being Z height data in the slow scan axis of the data scan, and maps the surface data to the reference data to generate a final data image of the sample corrected for creep.

11. The AFM of claim 10, wherein the reference data is low resolution topography data.

12. The AFM of claim 11, wherein the AFM is operated in one of peak force tapping (PFT) mode, contact mode and tapping mode.

13. The AFM of claim 10, wherein the processor maps the surface data to the reference data in real time during AFM operation.

14. The AFM of claim 10, wherein the scanner is a piezoelectric tube scanner.

15. The AFM of claim 10, wherein the sensor is a capacitance sensor coupled to the scanner.

16. The AFM of claim 10, wherein the processor maps the surface data to the reference data to compensate for the effects of AFM creep in the surface data.

* * * * *